United States Patent [19]
Cordova

[11] Patent Number: 5,769,431
[45] Date of Patent: Jun. 23, 1998

[54] BACKPACK AND LOAD CONVEYANCE APPARATUS

[76] Inventor: Paul Cordova, 28881 Hillside Rd., Pueblo, Colo. 81006

[21] Appl. No.: 553,857

[22] Filed: Nov. 6, 1995

[51] Int. Cl.$^6$ .................................................. B62D 51/04
[52] U.S. Cl. .................... 280/1.5; 280/47.131; 280/47.33
[58] Field of Search ......................... 280/1.5, 204, 47.12, 280/47.131, 47.24, 47.26, 47.27, 47.28, 47.29, 47.33

[56] References Cited

U.S. PATENT DOCUMENTS

| | | | |
|---|---|---|---|
| 4,236,723 | 12/1980 | Lemmon | 280/1.5 |
| 4,664,395 | 5/1987 | McCoy | 280/1.5 |
| 5,005,844 | 4/1991 | Douglas et al. | 280/1.5 |
| 5,215,318 | 6/1993 | Capraro | 280/1.5 |
| 5,244,217 | 9/1993 | Kotulla | 280/1.5 |
| 5,265,891 | 11/1993 | Diehl | 280/1.5 |
| 5,385,355 | 1/1995 | Hoffman | 280/1.5 |

*Primary Examiner*—Kevin Hurley
*Attorney, Agent, or Firm*—Phillip A. Rein

[57] ABSTRACT

A backpack and load conveyance apparatus operable to receive and convey numerous types of items through a conventional type backpack shoulder and waist support assembly. The backpack and load conveyance apparatus includes 1) a shoulder harness support assembly; and 2) a main collapsible load conveyance assembly having an upper connector frame assembly and a lower support frame assembly, both of which can be disconnected for ease of storage and conveyance in a vehicle. The shoulder harness support assembly is operable through a body connector assembly to be readily attached to the shoulder and waist areas of a user thereof. The upper connector frame assembly is operable to be readily attached to the shoulder harness support assembly in a manner to allow shock absorbing relative vertical movement, rotational movement, and pivotal movement for ease of usage. The lower support frame assembly is provided with a support wheel assembly and a foldable nose plate assembly. The support wheel assembly is provided with a spring bias assembly to provide a shock absorbing feature to wheel support members which are engageable with a ground support surface. The spring bias assembly provides bias means and prevents rotational movement of the wheel support members for ease of movement over rough terrain. The foldable nose plate assembly provides a nose plate frame assembly for supporting various items thereon and is foldable into a collapsed position for ease of storage and transporting. Further, an inclined support strut is provided which can be moved from an inclined usage condition to hold the main collapsible load conveyance assembly in an upwardly inclined loading and unloading position to a collapsed storage position.

20 Claims, 4 Drawing Sheets

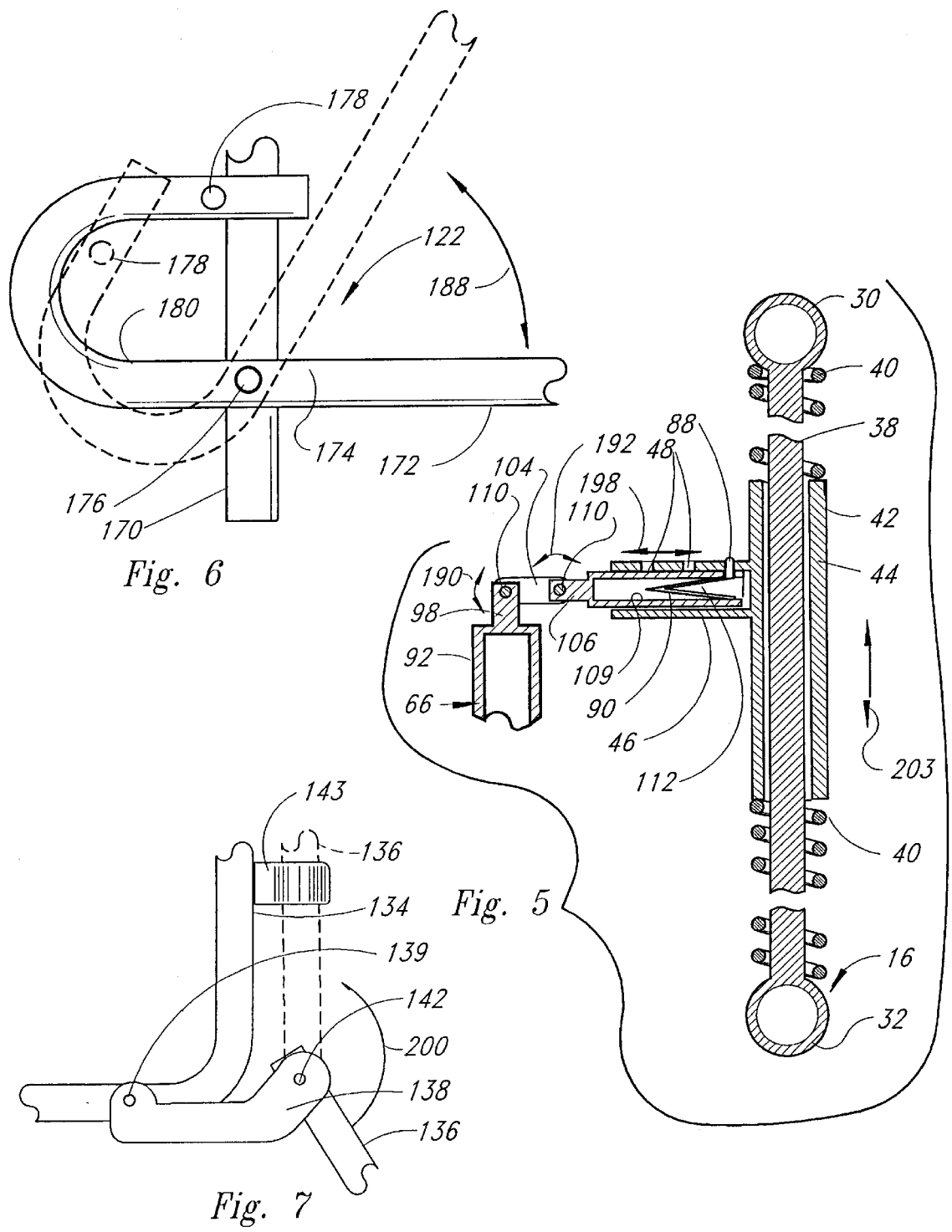

BACKPACK AND LOAD CONVEYANCE APPARATUS

PRIOR ART

A patent search revealed the following United States patents:

| Patent No. | Invention | Inventor |
|---|---|---|
| 3,856,191 | PACK FRAME | Harold J. Pohl |
| 4,157,837 | BACK AND STROLL CARRIER | David T. Kao |
| 4,045,040 | DEER STAND AND GAME CARRIER | Hershell W. Fails |
| 4,368,835 | BACK CARRIER | Arthur D. Murphy |
| 4,664,395 | MULTI-PURPOSE UNIAXIAL LITTER ENGINERY OR M.U.L.E. | Melvin McCoy |
| 4,762,256 | CONVERTIBLE STROLLER-BACKPACK BABY CARRIER | Len Whitaker |
| 4,836,938 | MULTIPURPOSE CHAIR STRUCTURE | Timothy J. Kobasic |
| 4,838,565 | ROLLING TRAVOIS | Douglas et al |
| 5,005,844 | TRAVOIS WITH ROLLER ASSEMBLY | Douglas et al |

Numerous of the cited references are related to backpack and baby carriers such as the Kao, Murphy, Whitaker, and Kobasic patents.

The Pohl patent discloses a pack frame which has wheel members and attached to a person's waist for conveyance.

The Fails patent discloses a deer stand and game carrier utilizing a backpack, a support frame, and wheel assemblies. As noted in FIGS. 3 and 4, the Fails patent is provided with extendable legs to present a deer stand.

The McCoy patent discloses a multi-purpose structure teaching use of a pair of movable support legs for use in loading and unloading the load conveyance assembly.

The Douglas patents disclose a travois with roller assembly or wheel assembly. The features include being carried on a backpack to be pulled behind the user thereof; having a conveyance frame which is rotatable and movable, at least upwardly; and having a load support wheel.

PREFERRED EMBODIMENT OF THE INVENTION

In one preferred embodiment of this invention, a backpack and load conveyance apparatus is provided which may be utilized with an umbrella and operable to receive, support, and transport numerous various articles such as a welding tank with associated welding hoses, goods, and supplies therewith; a golf bag with associated other items such as clothing and refreshments connected thereto; a conveyance for an infant seat; and a conveyance item for groceries such as water bottles, soda pop cans, food, and the other items.

The backpack and load conveyance apparatus is operable to be transported across smooth and rough terrain on wheel members and having a backpack harness assembly so as to be readily attached to a user thereof for pulling with substantial loads thereon to any desired location and usable for camping purposes.

The backpack and load conveyance apparatus includes 1) a shoulder harness support assembly adapted to be mounted about and supported on a shoulder and waist area of a person utilizing same; and 2) a main collapsible load conveyance assembly which is pivotally connected to the shoulder harness support assembly and having means for carrying various types of loads thereon.

The shoulder harness support assembly includes 1) a main support frame assembly; and 2) a body connector assembly connected to the main support frame assembly. The main support frame assembly includes a support frame member of generally square shape and having connected thereto a biased guide control assembly.

The biased guide control assembly includes a center support tube member secured at opposite ends to the support frame member and having a guide member slidably mounted on the center support tube. A respective bias member is mounted on the center support tube on opposite sides of the a guide member.

The guide member is of "T" shape with a head section mounted about the center support tube integral with a leg section having adjustment holes therein. The leg section is operable to be adjustably attached to a portion of the main collapsible load conveyance assembly as will be explained.

The body connector assembly includes a shoulder strap assembly and a waist belt support assembly, both connected to portions of the support frame member of the main support frame assembly and selectively connected to the user of the backpack and load conveyance apparatus.

The shoulder strap assembly is provided with shoulder pad members connected to adjustable connector straps which, in turn, have outer ends thereof connected as by anchor rivets to upper and lower portions of the support frame member of the main support frame assembly. The shoulder pad members are provided with padded material to provide a cushion and comfort to the shoulder areas of the person utilizing same.

The waist belt support assembly is of a conventional nature having a first strap section and second strap section having outer ends thereof connected to portions of the support frame member as by anchor rivets and outer ends interconnected by a releasable buckle member.

The main collapsible load conveyance assembly is provided with two major elements including 1) an upper connector frame assembly which is operable to be pivotally connected to the shoulder harness support assembly; and 2) a lower support frame assembly operable to be adjustably and releasably connected to the upper connector frame assembly and supported on a ground support surface.

The upper connector frame assembly includes an upper support basket and the lower support frame assembly is provided with a lower support basket. Both of these support baskets are operable to receive and convey items therein such as suntan lotion, soda pop cans, water bottles, food products, etc.

The upper connector frame assembly includes a primary support frame assembly of U-shape having a harness connector assembly connected thereto. The primary support frame assembly includes 1) a pair of spaced tubular parallel leg members; 2) a mid support member interconnecting upper spaced ends of the support leg members; 3) a transverse support member interconnecting a mid portion of the spaced support leg members; and 4) an umbrella support tube of generally J-shape connected to a mid portion of the mid support member.

Each support leg member is provided with a lower off-set connector shaft operable to be releasably and adjustably connected by a detent member to an upper portion of the lower support frame assembly in a manner to be explained.

The harness connector assembly includes 1) a vertical support tube having an upper connector lug; 2) a frame connector tube interconnecting the vertical support tube; and 3) a harness connector linkage pivotally connected to the upper connector lug on the vertical support tube leg section and to the guide member of the biased guide control assembly.

The vertical support tube is provided with a lower offset connector shaft which is operable to be releasably and adjustably mounted in a portion of the lower support frame assembly by another one of the detent members.

The harness connector linkage is provided with 1) a first link member having one end pivotally connected to the upper connector lug; and 2) a second link member pivotally connected to an outer end of the first link member.

The second link member is integral with a connector tube which is releasably, adjustably, and telescopingly mounted within the leg section of the guide member of the bias guide control assembly of the main support frame assembly.

The lower support frame assembly includes 1) a secondary support frame assembly; 2) a harness support assembly connected to the secondary support frame assembly; 3) a support wheel assembly connected to a lower portion of the secondary support frame assembly; and 4) a foldable nose plate assembly connected to a mid portion of the secondary support frame assembly.

The secondary support frame assembly includes 1) a pair of primary support tubes in spaced parallel relationship to each other; 2) a transverse support tube interconnecting an upper portion of the primary support tubes; and 3) an anchor strap assembly connected to an upper portion of the primary support tubes operable to surround, enclose, and anchor items therewith.

As noted in FIG. 2, lower portions of respective ones of each primary support tube are integral with a lower wheel support tube which is inclined laterally therefrom. The primary support tubes are provided at upper ends thereof with spaced adjustment holes therein for use in attachment to the upper connector frame assembly with the detent members as will be noted.

The harness support assembly includes 1) an L-shaped connector tube having one end secured to and laterally extended rearwardly from a mid portion of the transverse support tube; and 2) an inclined support strut connected by a connector bracket to the L-shaped connector tube.

The L-shaped connector tube is provided at an upper end thereof with adjustment holes therein for releasable and adjustable connection to a portion of the upper connector frame assembly by the detent member.

As noted in FIG. 7, the connector bracket is secured to the L-shaped connector tube and the inclined support strut is pivotally connected thereto by a pivot shaft. The inclined support strut is operable to engage a shaft anchor clip when in a storage condition and to be released therefrom and used as an inclined support member when holding the main collapsible load conveyance assembly in an inclined load or unloading condition.

The support wheel assembly is provided with a bearing member having connected thereto a tire and spoke member; an adjustable nut and bolt member to connect the bearing member to a wheel support shaft; and a spring bias assembly to releasably support the wheel support shaft.

The spring bias assembly includes a pair of parallel spaced support tubes having inner ends secured to respective lower ones of the wheel support tubes and having a shaft support assembly connected thereto. Each shaft support assembly includes a connector main body having an outer end thereof secured to a laterally extended wheel shaft member and a bias member mounted about the connector main body.

More particularly, the bias member is mounted about a lower portion of the connector main body and a clip pin hole is provided in an upper portion to receive an anchor clip pin therethrough to hold in an assembled condition.

In the assembled condition, each wheel shaft member is spring loaded by the bias member and having the support wheel assembly rotatably mounted through the bearing member on an outer end of the wheel shaft member to provide a shock absorbing feature thereto.

The foldable nose plate assembly includes 1) a pair of spaced cooperating support arm members of L-shape having an upper end thereof secured to a mid portion of respective ones of the spaced primary support tubes of the secondary support frame assembly; and 2) a nose plate frame assembly pivotally connected to lower spaced ends of the support arm members. The nose plate frame assembly is operable to be pivoted upwardly to a non-use condition and outwardly and laterally to a load carrying condition.

The nose plate frame assembly includes a support frame member having a side portion of J-shape integral with an intermediate portion and having a connector pivot shaft and a stop shaft connected to the support frame member.

The connector pivot shaft is operable to pivotally connect the side portions of the support frame member to the lower ends of the support arm members. The stop shaft is operable to operate as a stop function to hold the foldable nose plate assembly in the usage, generally horizontally position on abutment with respective ones of the support arm members and prevent further outward movement thereof.

OBJECTS OF THE INVENTION

One object of this invention is to provide a backpack and load conveyance apparatus which is operable to be readily and releasably attached to the shoulder and waist area of a person utilizing same through a shoulder harness support assembly which, in turn, is pivotally connected to a main collapsible load conveyance assembly operable to receive, support, and transport numerous articles thereon being usable for normal load conveyance activities and for hiking over rough terrain.

Another object of this invention is to provide a backpack and load conveyance apparatus including a shoulder harness assembly pivotally and rotatably connected to a main collapsible load conveyance assembly which has an upper connector frame assembly releasable and adjustably connected to a lower support frame assembly which is provided with a support wheel assembly for movement over rough terrain and to remote locations with a minimum amount of effort.

One other object of this invention is to provide a backpack and load conveyance apparatus including a shoulder harness support assembly releasably connected to a main collapsible load conveyance assembly having an upper connector frame assembly and a lower support frame assembly, all of which are readily adjustably connected to each other and may be easily disconnected into separate parts thereof for ease of storage and conveyance in a vehicle.

A further object of this invention is to provide a backpack and load conveyance apparatus including a harness support assembly readily mounted on the shoulders and waist area of the user thereof and pivotally and rotatably connected to a main collapsible load conveyance assembly which is operable to receive, anchor, and transport numerous objects thereon such as 1) a welding tank with hoses and other supplies; 2) a golf cart with additional supplies and refreshments mounted thereon; 3) an infant seat assembly with necessary infant maintenance supplies mounted thereon; and 4) numerous other goods and accessories as deemed necessary for a given camping, hiking, or sports activity.

One further object of this invention is to provide a backpack and load conveyance apparatus having a new and novel support wheel assembly provided with non-pivotal shock absorbing features so as to provide comfort to an infant being carried thereon over rough surfaces and terrain.

One other object of this invention is to provide a backpack and load conveyance apparatus having a shoulder harness support assembly readily mounted on the shoulder and waist area of a user thereof which, in turn, is pivotally and rotatably connected to a main collapsible load conveyance assembly which is operable to receive, support, and anchor numerous items thereon for use in hunting, hiking and sports activities and having a transverse support tube to hold in an inclined position for adding and removing items thereto, and having an umbrella support tube thereon to releasably receive and support an umbrella member thereon.

Still, one other object of this invention is to provide a backpack and load conveyance apparatus which is operable in a disassembled condition to be readily stored in a minimum amount of space or conveyed in a limited trunk area of a vehicle; easily assembled and disassembled from a sturdy, rigid condition without the use of tools or skills required; constructed of a lightweight tubular material but having substantial strength to receive and contain heavy load thereon; provided with an inclined support strut for holding in an inclined upright position for loading and unloading items thereon; and substantially maintenance free.

Various other objects, advantages, and features of the invention will become apparent to those skilled in the art from the following discussion, taken in conjunction with the accompanying drawings, in which:

FIGURES OF THE INVENTION

FIG. 5 is an enlarged fragmentary sectional view taken along line 5—5 in FIG. 1;

FIG. 6 is a fragmentary side elevational view illustrating a foldable nose plate assembly with pivotal movement thereof shown in dotted lines;

FIG. 7 is a fragmentary elevational view illustrating movement of an inclined support strut illustrated in a non-usage anchored condition in dotted lines.

Figure 1:
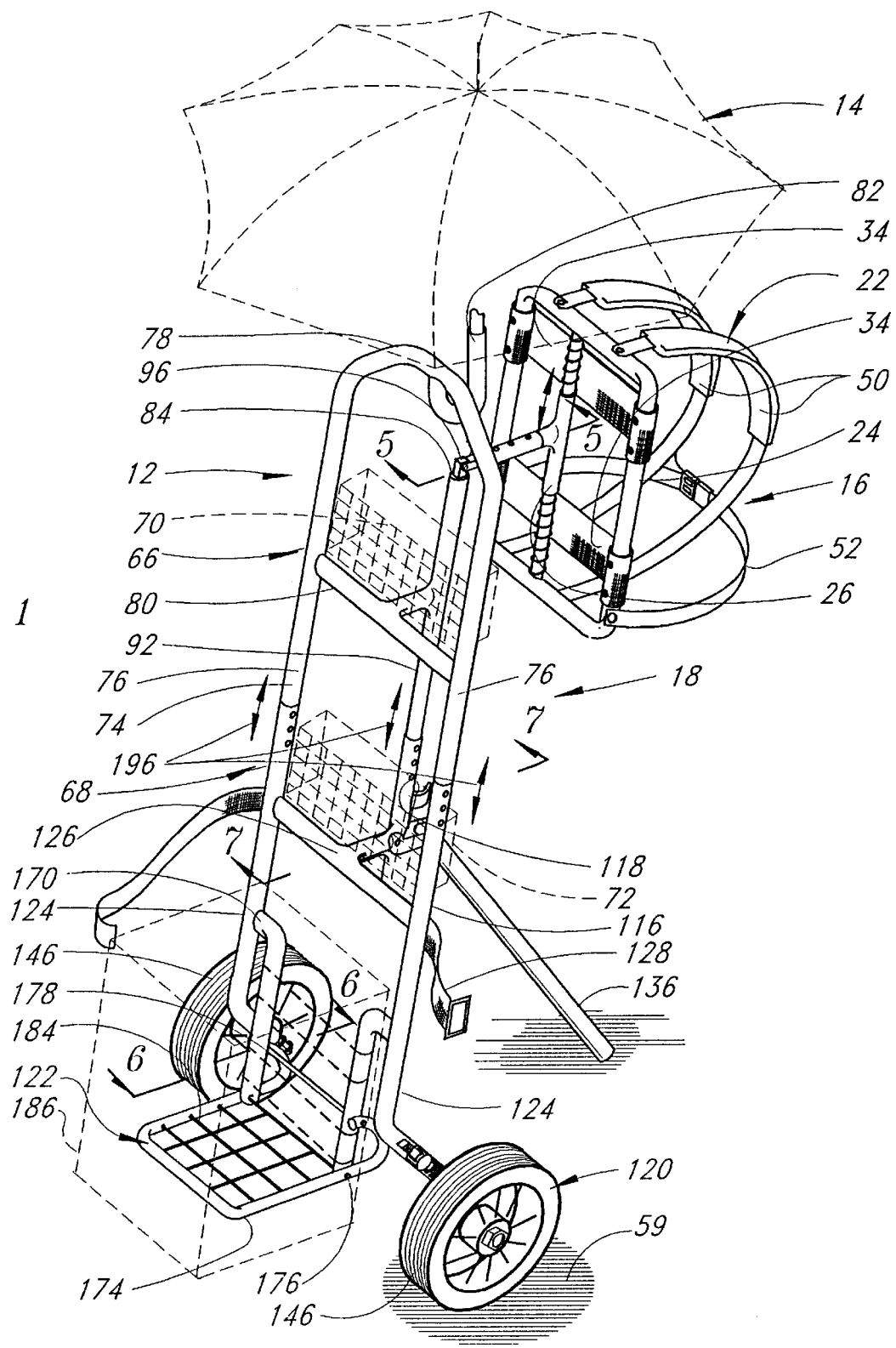
FIG. 1 is a perspective view of the backpack and load conveyance apparatus of this invention with an umbrella shown utilized th[ ]e with in dotted lines.

The following is a discussion and description of preferred specific embodiments of the backpack and load conveyance apparatus of this invention, such being made with reference to the drawings, whereupon the same reference numerals are used to indicate the same or similar parts and/or structure. It is to be understood that such discussion and description is not to unduly limit the scope of the invention.

DESCRIPTION OF THE INVENTION

On referring to the drawings in detail, and in particular to FIG. 1, a backpack and load conveyance apparatus of this invention, indicated generally at 12, may be used with an umbrella 14 (shown in dotted lines) and used to convey and transport numerous and various items thereon by a user thereof.

The backpack and load conveyance apparatus 12 is operable to convey numerous types of items such as a welding tank with associated supplies like welding hose, head gear, gloves, etc.; a golf bag with associated items therewith such as shoes, beverage containes, raincoat, and the like; an infant or baby carrier seat with associated infant supplies associated therewith; and numerous other types of items which can be contained within support baskets or secured thereto through use of elastic straps and belt s and buckles.

The backpack and load conveyance apparatus 12 includes 1) a shoulder harness support assembly 16 which can be readily connected about the shoulder and waist area of a user thereof, and 2) a main collapsible load conveyance assembly 18 which is rotatably and pivotally connected to the shoulder harness support assembly 16.

Figure 8:
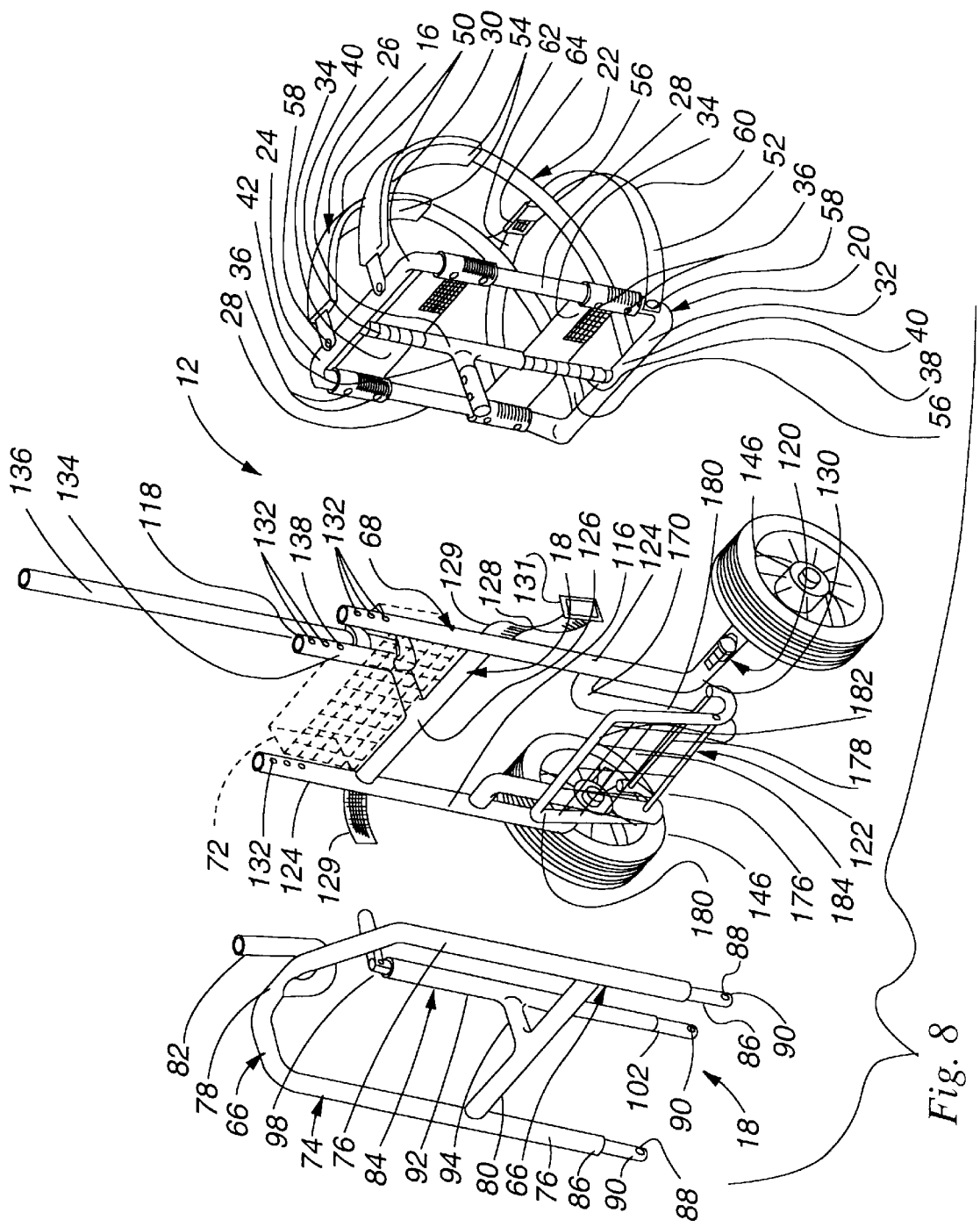
FIG. 8 is an exploded perspective view illustrating the backpack and load conveyance apparatus of this invention in a disassembled condition.

As best shown in FIG. 8, the shoulder harness support assembly 16 includes a main support frame assembly 20 having 1) a support frame member 24 of tubular construction and generally square shape; and 2) a bias guide control assembly 26 connected to the support frame member 24.

The support frame member 24 consists of 1) a pair of spaced parallel side tube members 28; 2) a top tube member 30; and a bottom tube member 32 interconnected to the upper and lower outer respective ends of the side tube members 28; and 3) back support straps 34 connected between respective upper and lower ends of the side tube members 28.

The back support straps 34 are secured in a conventional manner about the upper and lower portions of the side tube members 28 and secured thereto in a taut condition by anchor members 36 which are preferably rivet members.

The bias guide control assembly 26 includes 1) a center support tube member 38 connected and mounted between the upper and lower spaced top tube member 30 and the bottom tube member 32; 2) a pair of bias members 40 mounted about respective upper and lower ends of the center support tube member 38; and 3) a guide member 42 mounted for sliding reciprocal movement on the center support tube member 38 and having the respective bias members 40 mounted on upper and lower sides thereof.

As shown in FIG. 5, the guide member 42 is of a "T" shape having a head section 44 integral with a central leg section 46 extended perpendicular thereto. The head section 44 is mounted about the center support tube member 38 for sliding axial movement thereon being biased to a neutral or central position by the bias members 40 mounted on each opposite side thereof.

The leg section 46 is of a hollow tubular construction and having thereon spaced adjacent adjustment holes 48 for reasons to be explained.

As best shown in FIG. 8, the body connector assembly 22 includes 1) a pair of spaced shoulder strap assemblies 50 mounted between the top tube member 30 and the bottom tube member 32 and secured thereto by anchor rivets 58; and 2) a waist belt support assembly 52 operable to be connected to lower portions of the side tube members 38 as by the anchor rivets 58.

Each shoulder strap assembly 50 includes a shoulder pad member 54 mounted on adjustable connector straps 56 which, in turn, are secured by the anchor rivets 58 to the respective top tube member 30 and the bottom tube member 32.

The shoulder pad members 54 are mounted about the upper ends of the adjustable connector straps 56 so as to provide a cushioning effect to the shoulder area of the user utilizing same.

The waist belt support assembly 52 includes a first strap section 60 and a second strap section 62, each having an outer end connected by the anchor rivets 58 to respective adjacent ones of the side tube members 28. Opposite ends of the first strap section 60 and the second strap section 62 are interconnected in a conventional manner by a releasable, adjustable buckle member 64.

The main collapsible load conveyance assembly 18 includes 1) an upper connector frame assembly 66 operable to be releasably and adjustably connected to the shoulder harness support assembly 16; and 2) a lower support frame assembly 68 operable to be releasably and adjustably connected to the upper connector frame assembly 66 and operable to be supported and moved along a ground support surface 59.

As noted in FIG. 1, the upper connector frame assembly 66 is provided with an upper support basket 70 and, similarly, the lower support frame assembly 68 is provided with a lower support basket 72. The support baskets 70, 72 are preferably constructed of a wire frame material and operable to receive and convey items therein such as beverage cans, water bottles, food items, and the like.

The upper connector frame assembly 66 includes a primary support frame assembly 74 of generally U-shape having a harness connector assembly 84 secured thereto. The primary support frame assembly 74 includes 1) a pair of parallel spaced support leg members 76; 2) a mid or top support member 78 interconnecting upper ends of the support leg members 76; 3) a transverse support member 80 interconnecting opposed mid portions of the support leg members 76; and 4) an umbrella support tube 82 of generally J-shape connected to a mid portion of the mid support member 78 and operable to receive and support the umbrella 14 therein.

Each support leg member 76 is provided with a lower offset connector shaft 86 having a connector detent hole 88 therein to receive a portion of a detent member 90 therein for use and operation as will be noted.

The harness connector assembly 84 includes 1) a vertical support tube 92; 2) a frame connector tube 94 connected to a mid portion of the vertical support tube 92 and similarly to the transverse support member 80; and 3) a harness connector linkage 96 releasably connected between the vertical support tube 92 and the guide member 42 on the bias guide control assembly 26 of the shoulder harness support assembly 16 as best noted in FIG. 5.

The vertical support tube 92 is provided with an upper connector lug 98 and a lower offset connector shaft 102 for connection to the lower support frame assembly 68 as will be explained. The lower offset connector shaft 102 is provided with a detent hole 88 to receive one of the detent members 90 therein for use as will be explained.

As best shown in FIG. 5, the harness connector linkage 96 includes 1) a first link member 104 pivotally connected through a pivot pin 110 to the upper connector lug 98; and 2) a second link member 106 pivotally connected by another pivot pin 110 to an outer end of the first link member 104. The second link member 106 is integral with a connector tube 109 which has a detent hole 88 and a detent member 90 mounted therein for releasable and adjustable connection to the leg section 46 of the guide member 42 in a manner to be explained.

As noted in FIG. 5, each detent member 90 is provided with a spring section 112 to which is connected a lock member 114 that is spring biased through the detent hole 88 for releasable engagement in an adjusted position. All detent members 90 are similarly constructed and operable.

As best noted in FIG. 8, the lower support frame assembly 68 includes 1) a secondary support frame assembly 116; 2) a harness support assembly 118 connected to the secondary support frame assembly 116; 3) a support wheel assembly 120 secured to a lower end of the secondary support frame assembly 116; and 4) a foldable nose plate assembly 122 connected to a lower mid portion of the secondary support frame assembly 116.

The secondary support frame assembly 116 includes 1) a pair of spaced, parallel, primary support tubes 124 interconnected at an upper portion thereof by a transverse support tube 126; 2) an anchor strap assembly 128 connected to an upper portion of the primary support tubes 124; and 3) a lower wheel support tube 130 integral with a lower end of the respective primary support tubes 124 and extended laterally and rearwardly therefrom at an angle of approximately 45 degrees.

Each primary support tubes 124 is provided with a plurality of spaced adjustment holes 132 at upper ends thereof for ease of attachment by a detent member 90 to the upper connector frame assembly 66.

The anchor strap assembly 128 is of a conventional nature having strap members 129 with outer ends secured to the primary support tubes 124 as by rivet members or the like and the outer ends thereof are interconnected by a buckle assembly 131 for ease of attachment to items being carried thereon.

The harness or upper frame support assembly 118 includes an L-shaped connector tube 134 having a support strut 136 pivotally connected thereto by a connector bracket 138 as best shown in FIG. 7. The L-shaped connector tube 134 is provided at an upper portion thereof with a plurality of spaced, adjacent adjustment holes 132 for connection to a portion of the upper connector frame assembly 66 in a detent member 90 as will be explained.

As shown in FIG. 7, the connector bracket 138 is secured by an anchor pin 139 to a portion of the L-shaped connector tube 134 and held in a rigid relationship thereon. An outer end of the connector bracket 138 is secured by a pivot shaft 142 to a lower end of the inclined support strut 136 so it is pivotal from a usage connection to a dotted line storage position whereupon it is held by a U-shaped spring clip or shaft anchor clip 143 against a vertical upright portion of the L-shaped connector tube 134.

Figure 2:
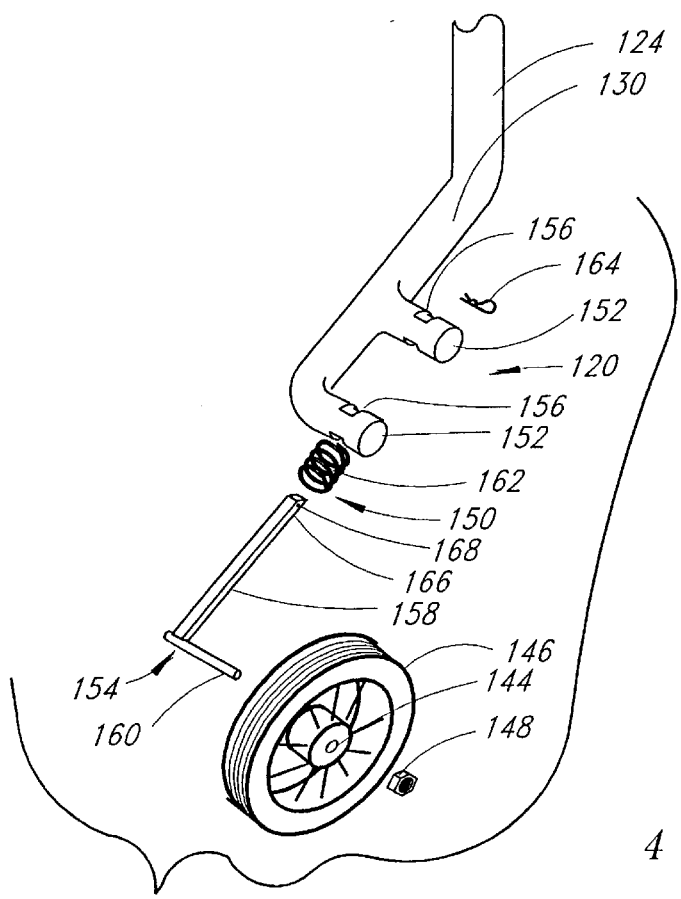
FIG. 2 is an exploded fragmentary perspective view of a support wheel assembly of this invention.
Figure 3:
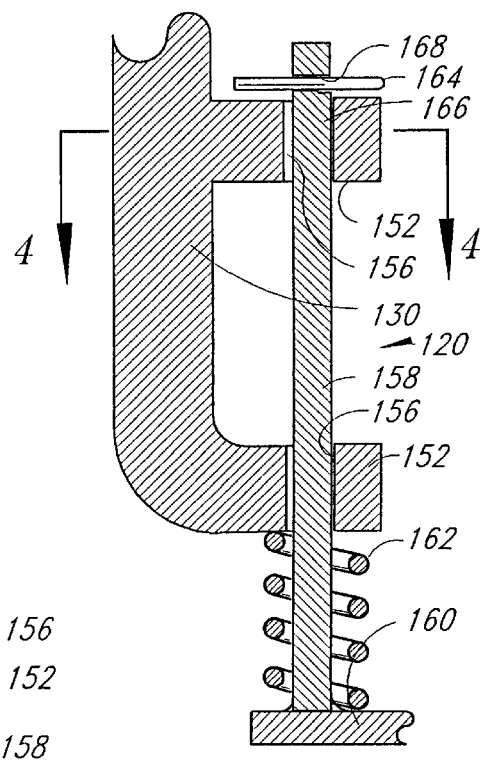
FIG. 3 is a sectional view of a portion of the support wheel assembly in an assembled condition.
Figure 4:
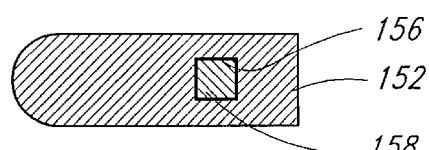
FIG. 4 is a sectional view taken along line 4—4 in FIG. 3.

As shown collectively in FIGS. 2, 3, and 4, the support wheel assembly 120 includes a bearing member 144 connected to a central portion of a wheel member or a tire and spoke wheel member 146 and associated with an adjustment nut member 148 and a spring bias assembly 150 in order to achieve assembled condition.

The spring bias assembly 150 includes a pair of parallel spaced support tubes 152 connected to respective ones of the lower wheel support tubes 130 and operable to receive a shaft support assembly 154 connected thereto. Each support tube 152 is provided with a connector opening 156 of square shape in transverse cross section and aligned with each other.

The shaft support assembly 154 is provided with 1) a connector main body 158 having a lower end connected to a laterally extended wheel shaft member 160; 2) a bias member 162 which is mounted about a lower portion of the connector main body 158; and 3) an anchor clip pin 164 to hold in the assembled condition of FIG. 3.

More specifically, the connector main body 158 is of a square shape in transverse cross section so as to be received within the similarly shaped aligned connector openings 156 in the support tubes 152 for reciprocal but non-rotational movement.

Each connector main body 158 is provided with an upper end section 166 having a clip pin opening 168 to receive a respective one of the anchor clip pins 164 therethrough as noted in FIG. 3.

An outer end of the wheel shaft member 160 is threaded and operable to receive the bearing member 144 which is held thereon through the adjustment nut member 148 and freely rotatable thereon in a conventional manner.

The foldable nose plate assembly 122 includes 1) a pair of spaced support arm members 170 of L-shape; and 2) a nose plate frame assembly 172 pivotally connected to, and mounted between, the spaced support arm members 170. An upper end of the support arm members 170 is connected to mid portions of the primary support tubes 124 as noted in FIG. 8.

The nose plate frame assembly 172 includes 1) a generally rectangular support frame member 174; 2) a connector pivot shaft 176 for pivotal connection of the support frame member 174 to lower ends of spaced ones of the primary support tubes 124; and 3) a stop shaft 178 connected to an upper, outer portion of the support frame member 174.

As shown in FIG. 8, the support frame member 174 is provided with a pair of side portions 180 of J-shape having upper ends thereof interconnected by an intermediate portion 182. A plurality of support straps 184 are mounted across the side portions 180 and the intermediate portion 182 to provide a lawn chair type support surface which can be of a slightly flexible nature but strong enough to support a heavy load thereon.

It is noted that numerous ones of spring loaded detent type assemblies are used in this invention, namely three, in the interconnection of the offset connector shafts 86 for interconnection of the upper connector frame assembly 66 with the lower support frame assembly 68 from the disassembled condition of FIG. 8 to the assembled condition shown in FIG. 1.

Further, this spring loaded detent type assembly is noted in FIG. 5 whereupon the detent member 90 has been described as having the spring section 112 with the lock member 114 connected thereto which is operable to be spring biased outwardly through a respective detent hole 88.

Therefore, there are four of these detent type assemblies presented in this invention as detent members 90 which allows the disassembly of the three main elements thereof, namely the shoulder harness support assembly 16, the upper connector frame assembly 66, and the lower support frame assembly 68 to the disassembled condition as noted in FIG. 8. In this condition, it is also obvious that the inclined support strut 136 can be disconnected from the shaft anchor clip 143 to move downwardly into a collapsed condition.

USE AND OPERATION OF THE INVENTION

In the use and operation of the backpack and load conveyance apparatus 12 of this invention, we will first assume that it has been disassembled for purposes of storage and/or conveyance in a vehicle to the condition as noted in FIG. 8.

The first step would be to take the lower support frame assembly 68 and position in the inclined vertical condition of FIG. 8. The inclined support strut 136 can be pivoted clockwise from the position as noted in FIG. 8 in order to hold the lower support frame assembly 68 in the inclined condition supported on the ground support surface 59.

Next, the user thereof could grasp the upper connector frame assembly 66 and move it vertically from the position of FIG. 8 and place the offset connector shafts 86 of the support leg members 76 in axial alignment with the upper respective open end of the primary support tubes 124 and the L-shaped connector tube 134.

The offset connector shafts 86 and the lower offset connector shaft 102 are then moved axially into the adjacent primary support tubes 124 and L-shaped connector tube 134. At this time, the respective lock members 114 on the spring section 112 of each detent member 90 are biased inwardly and, subsequently, are moved outwardly under the spring bias force to be locked in a selective one of the adjustment holes 132. This provides not only a spring loaded assembly feature but achieves a certain amount of vertical adjustment therewith.

Next, the user would grasp the shoulder harness support assembly 16 and move the same vertically in order to align the connector tube 109 of the harness connector linkage 96 with the opening into the leg section 46 of the guide member 42.

As shown in FIG. 5 when axially aligned, the connector tube 109 is moved inwardly, as noted by an arrow 198, within the leg section 46. This would cause the spring section 112 and lock member 114 of the detent member 90 to be biased inwardly and to spring outwardly to be placed in a selected one of the adjustment holes 48 in the leg section 46. This provides a lateral adjustment as noted by the arrow 198.

Next, the user thereof may decide to first apply a load to the main collapsible load conveyance assembly 18 which can be in the form of a golf club bag with associated accessories and supplies; a welding tank with associated welding hoses, rods, etc.; an infant carrier assembly, and the like.

After the desired load is placed on the main collapsible load conveyance assembly 18, the user would then attach the shoulder harness support assembly 16, and more specifically, the shoulder strap assemblies 50 about the user's shoulder area in a conventional manner.

At this time, it is obvious that the waist belt support assembly 52 has been disconnected at the releasable buckle member 64 and placed about a waist area of the user thereof. At this time, the releasable buckle member 64 can be reattached and adjusted as so desired.

At the user's option and depending on weather conditions, the umbrella 14 may be readily mounted within the umbrella support tube 82 as noted in FIG. 1.

In this final assembled condition and being attached to a user thereof, it is obvious that the user can proceed in moving as so desired and the inclined support strut 136 would have been pivoted upwardly to a storage position as noted in dotted lines in FIG. 7 for engagement and clamping within the shaft anchor clip 143 as noted by an arrow 200.

The shoulder harness support assembly 16 is pivotally rotatably connected to the upper connector frame assembly 66 as noted by arrows 190, 192, 198, and 203 in FIG. 5 to allow for freedom of movement by the user thereof during movement over uneven or rough terrain.

The movement of the inclined support strut 136 from the usage to the storage condition is clearly shown by the arrow 200 in FIG. 7. Also, movement of the main support frame assembly 20 relative to the upper connector frame assembly 66 is noted by the arrow 203 in FIG. 5. Further, the pivotal movement of the foldable nose plate assembly 122 from the usage to the non-usage conditions is indicated by an arrow 188 in FIG. 6.

As best noted in FIG. 3, the support wheel assembly 120 with its connection to the spring bias assembly 150, as best noted in FIG. 3, provides a shock absorbing feature therein as noted by an arrow 205.

The backpack and load conveyance apparatus 12 of this invention presents a new and novel structure that is easy to assemble and disassemble from a folded storage and transport condition to a rigid extended usage condition; lightweight in construction as constructed of numerous tubular members while providing the necessary strength for usage; easily assembled and disassembled without requiring any special skills or tools to do so; providing new and novel pivotal interconnections for ease of movement on uphill and rough terrain; providing shock absorbing features to the support wheel assembly for ease of movement on uphill, down hill, and rough terrain; and providing anchor and support means thereon to convey various types of items which can be secured by strap members or carried in support baskets; providing multiple usages therewith; economical to manufacture; and substantially maintenance free.

While the invention has been described in conjunction with preferred embodiments thereof, it will be understood that this description is intended to illustrate and not to limit the scope of the invention, which is defined by the following claims:

I claim:

1. A backpack and load conveyance apparatus comprising:
   a) a harness support assembly adapted to be carried on shoulder and waist areas of a user thereof;
   b) a main load conveyance assembly having an upper connector frame assembly which is pivotally, rotatably, adjustably, and releasably connected to said harness support assembly;
   c) said main load conveyance assembly includes a lower support frame assembly which is releasably and adjustably connected to said upper connector frame assembly;
   d) said lower support frame assembly includes a support wheel assembly engagable with a support surface and a foldable nose plate assembly; and
   e) said foldable nose plate assembly includes a nose plate frame assembly pivotally connected to a portion of said lower support frame assembly and movable from a retracted position to a laterally extended position to receive loads thereon.

2. A backpack and load conveyance apparatus as described in claim 1, wherein:
   a) said support wheel assembly having a pair of wheel members, each rotatable about a respective wheel shaft member movable vertically under shock absorbing conditions, and held against rotational movement to maintain said wheel members in a straight line while being moved on a support surface.

3. A backpack and load conveyance apparatus as described in claim 1, wherein:
   a) said harness support assembly includes a main support frame assembly having a body connector assembly connected thereto for attachment to the shoulder and waist areas of the user thereof; and
   b) said main support frame assembly includes a bias guide control assembly having a guide member movable axially and bias members on opposite sides of said guide member to provide a shock absorbing feature between said harness support assembly and said upper connector frame assembly.

4. A backpack and load conveyance apparatus operable to receive, support, anchor, and convey numerous articles thereon, comprising:
   a) a harness support assembly adapted to be connected and supported about a shoulder and waist area of a user thereof;
   b) a main load conveyance assembly including an upper connector frame assembly releasably connected to a lower support frame assembly;
   c) said upper connector frame assembly pivotally, rotatably, and releasably connected to said harness support assembly; and
   d) said lower support frame assembly includes a support wheel assembly having a pair of wheel members each spring biased for a shock absorbing vertically inclined axial movement and held against rotational movement about the vertically inclined axis;
   whereby said harness support assembly, said upper connector frame assembly, and said lower connector frame assembly are all selectively releasable from each other for ease of storage and transporting.

5. A backpack and load conveyance apparatus as described in claim 4, wherein:
   a) said harness support assembly includes a main support frame assembly having a body connector assembly connected thereto;
   b) said main support frame assembly includes a support frame member with a support tube member having a guide control assembly mounted thereon; and
   c) said guide control assembly includes a guide member reciprocally mounted on said support tube member and having bias members on opposite sides of said guide member to provide a shock absorbing connection between said harness support frame assembly and said upper connector frame assembly.

6. A backpack and load conveyance apparatus as described in claim 4, wherein:
   a) said upper connector frame assembly includes an umbrella support tube operable to receive and support an umbrella therein;
   whereby the umbrella provides shade over said harness support assembly and the user thereof.

7. A backpack and load conveyance apparatus as described in claim 4, wherein:
   a) said upper connector frame assembly connected to said lower connector frame assembly by detent members; and
   b) said detent members selectively and releasably mounted in adjacent detent holes to adjust an overall height of said main load conveyance assembly.

8. A backpack and load conveyance apparatus as described in claim 4, including:
   a) an upper support basket connected to said upper connector frame assembly to receive and support objects therein;
   b) a lower support basket connected to said lower connector frame assembly to receive and support objects therein; and
   c) an anchor strap assembly connected to said lower connector frame assembly to anchor objects against said lower connector frame assembly.

9. A backpack and load conveyance apparatus as described in claim 4, wherein:
   a) said lower connector frame assembly having a pivotal support strut movable from a storage position mounted within an anchor clip to a released, inclined position to support said main load conveyance assembly in a stationary inclined position.

10. A backpack and load conveyance apparatus operable to convey various articles thereon, comprising:
   a) a harness support assembly;
   b) an upper connector frame assembly pivotally, rotatably, and releasably connected to said harness support assembly;
   c) a lower connector frame assembly releasably connected to said upper connector frame assembly;
   d) said lower connector frame assembly includes a support wheel assembly and a foldable nose plate assembly; and
   e) said support wheel assembly includes a pair of spaced wheel members each connected by a spring bias assembly to a portion of said lower connector frame assembly so as to be spring biased about a longitudinal axis for a shock absorbing feature.

11. A backpack and load conveyance apparatus as described in claim 10, wherein:
   a) said harness support assembly includes a support frame member connected to a biased guide control assembly to said upper connector frame assembly; and
   b) said biased guide control assembly includes a support tube member secured to said support frame member and a guide member mounted on said support tube member for rotational, axial, and biased movement thereon.

12. A backpack and load conveyance apparatus as described in claim 11, wherein:
   a) said biased guide control assembly includes a bias member mounted about said support tube member on each respective side of said guide member to provide biased movement of said guide member for a shock absorbing feature.

13. A backpack and load conveyance apparatus as described in claim 10, wherein:
   a) said upper connector frame assembly connected to said lower connector frame assembly by detent members selectively mounted in respective adjacent detent holes to provide length adjustment of said upper connector frame assembly and said lower connector frame assembly.

14. A backpack and load conveyance apparatus as described in claim 10, wherein:
   a) said upper connector frame assembly connected to said harness support assembly by a detent member and a harness connector linkage to adjustable, pivotal, rotatable, and spring loaded connection thereto.

15. A backpack and load conveyance apparatus as described in claim 10, wherein:
   a) said upper support frame assembly includes an umbrella support tube operable to receive and support an umbrella therein to provide shade over said harness support assembly.

16. A backpack and load conveyance apparatus as described in claim 10, wherein:
   a) said foldable nose plate assembly selectively mountable from a folded non-usage position to a forwardly projected usage position operable to receive and support an article thereon;
   b) said lower support frame assembly includes an anchor strap assembly operable to be mounted about the article on said foldable nose plate assembly to anchor thereon; and
   c) a support basket member mounted on said upper connector frame assembly or said lower connector frame assembly operable to receive and convey objects therein.

17. A backpack and load conveyance apparatus, comprising:
   a) a harness support assembly adapted to be carried on shoulder and waist areas of a user thereof;
   b) a main load conveyance assembly includes an upper connector frame assembly connected to said harness support assembly and a lower support frame assembly connected to said upper connector frame assembly;
   c) said harness support assembly includes a main support frame assembly connected by a guide control assembly to said upper connector frame assembly to provide a shock absorbing connection;
   d) said main support frame assembly includes a support frame member having a support tube member connected thereto; and
   e) said guide control assembly having a guide member movable axially and reciprocally on said support tube member and bias members on opposite sides of said guide member and about said support tube member to provide a shock absorbing feature between said harness support assembly and said upper connector frame assembly.

18. A backpack and load conveyance apparatus, comprising:
   a) a harness support assembly adapted to be carried on shoulder and waist areas of a user thereof;
   b) a main load conveyance assembly includes an upper connector frame assembly connected to said harness support assembly and a lower support frame assembly connected to said upper connector frame assembly;
   c) said harness support assembly connected by a guide control assembly to said upper connector frame assembly to provide a shock absorbing connection, and
   d) said upper connector frame assembly includes an umbrella support tube operable to receive and support an umbrella therein;
   whereby the umbrella provides shade over said harness support assembly and the user thereof.

19. A backpack and load conveyance apparatus as described in claim 18, including:
   a) an upper support basket connected to said upper connector frame assembly to receive and support objects therein; and
   b) an anchor strap assembly connected to said lower support frame assembly to anchor objects against said lower support frame assembly.

20. A backpack and load conveyance apparatus as described in claim 18, wherein:
   a) said lower support frame assembly having a pivotal support strut movable from a storage position to a released position to support said main load conveyance assembly in a stationary inclined position.

* * * * *